(12) United States Patent
Schenk et al.

(10) Patent No.: US 10,708,967 B2
(45) Date of Patent: Jul. 7, 2020

(54) ESTABLISHMENT OF A CONNECTION BETWEEN TWO LOCAL DEVICES CONNECTED TO DIFFERENT NETWORKS

(71) Applicants: Koninklijke KPN N.V., Rotterdam (NL); Nederlandse Organisatie voor Toegepast-Natuurwetenschappelijk Onderzoek TNO, s-Gravenhage (NL)

(72) Inventors: Michael Schenk, The Hague (NL); Sander de Kievit, Leiden (NL); Antonius Norp, The Hague (NL); José Almodóvar Chico, Delft (NL)

(73) Assignees: Koninkilijke KPN N.V., Rotterdam (NL); Nederlandse Organisatie voor Toegepast-Natuurwetenschappelijk Onderzoek TNO, s-Gravenhage (NL)

( * ) Notice: Subject to any disclaimer, the term of this patent is extended or adjusted under 35 U.S.C. 154(b) by 25 days.

(21) Appl. No.: 16/065,760

(22) PCT Filed: Dec. 23, 2016

(86) PCT No.: PCT/EP2016/082528
§ 371 (c)(1),
(2) Date: Jun. 22, 2018

(87) PCT Pub. No.: WO2017/114773
PCT Pub. Date: Jul. 6, 2017

(65) Prior Publication Data
US 2019/0014611 A1    Jan. 10, 2019

(30) Foreign Application Priority Data
Dec. 28, 2015    (EP) .................................... 15202824

(51) Int. Cl.
*H04W 76/15*    (2018.01)
*H04W 76/14*    (2018.01)
(Continued)

(52) U.S. Cl.
CPC ......... *H04W 76/15* (2018.02); *H04L 12/4604* (2013.01); *H04L 41/0806* (2013.01);
(Continued)

(58) Field of Classification Search
CPC ..... H04W 76/15; H04W 76/00; H04W 76/40; H04W 40/24; H04W 40/00; H04W 72/00;
(Continued)

(56) References Cited

U.S. PATENT DOCUMENTS 6,738,472 B1 * 5/2004 Mayron ................ H04M 15/00
379/229
2001/0027484 A1 * 10/2001 Nishi ...................... H04L 12/46
709/223
(Continued)

FOREIGN PATENT DOCUMENTS

EP    3225071    10/2017
WO    2005/110208 A1    11/2005
(Continued)

OTHER PUBLICATIONS

European Patent Office, Extended European Search Report for EP Pat. App. No. 15197013.4, dated May 30, 2016.
(Continued)

*Primary Examiner* — Warner Wong
(74) *Attorney, Agent, or Firm* — McDonnell Boehnen Hulbert & Berghoff LLP

(57) ABSTRACT

One aspect of the disclosure relates to a method in a user equipment for instructing establishment of a connection between a first local device and a second local device, the user equipment being connected to a public network, wherein an intermediary system is configured to connect to a first local network, to a second local network and to the public network. A virtual view is generated and, upon receiving a selection of a representation in the view, con-
(Continued)

nectivity information is obtained regarding the communication path between the first local device and the second local device. An ability for user to instruct establishment of communication path in dependence of the connectivity information.

15 Claims, 9 Drawing Sheets

(51) Int. Cl.
| | |
|---|---|
| *H04L 12/46* | (2006.01) |
| *H04L 12/24* | (2006.01) |
| *H04W 88/04* | (2009.01) |
| *H04W 4/80* | (2018.01) |
| *H04W 76/40* | (2018.01) |
| *H04W 40/24* | (2009.01) |
| *H04W 88/06* | (2009.01) |

(52) U.S. Cl.
CPC ............. *H04L 41/12* (2013.01); *H04W 76/14* (2018.02); *H04W 4/80* (2018.02); *H04W 40/24* (2013.01); *H04W 76/40* (2018.02); *H04W 88/04* (2013.01); *H04W 88/06* (2013.01)

(58) Field of Classification Search
CPC ........ H04W 28/00; H04L 41/12; H04L 41/08; H04L 41/0806; H04L 41/00; H04L 12/2859

See application file for complete search history.

(56) References Cited

U.S. PATENT DOCUMENTS

| | | | |
|---|---|---|---|
| 2002/0164997 A1 | 11/2002 | Parry | |
| 2003/0110334 A1* | 6/2003 | Lanigan | H04L 12/2803 710/72 |
| 2010/0189064 A1 | 7/2010 | Raveendran | |
| 2010/0293590 A1 | 11/2010 | Dandabany | |
| 2010/0312851 A1* | 12/2010 | Jackson | H04L 67/104 709/217 |
| 2011/0119678 A1* | 5/2011 | Filali-Adib | G06F 9/5077 718/105 |
| 2012/0147825 A1 | 6/2012 | Hassan et al. | |
| 2012/0265913 A1 | 10/2012 | Suumaki et al. | |
| 2013/0312066 A1 | 11/2013 | Suarez et al. | |
| 2014/0005809 A1 | 1/2014 | Frei et al. | |
| 2014/0177472 A1 | 6/2014 | Halasz et al. | |
| 2014/0195654 A1 | 7/2014 | Kiukkonen et al. | |
| 2015/0054947 A1 | 2/2015 | Dawes | |
| 2015/0365787 A1* | 12/2015 | Farrell | H04W 4/029 455/456.1 |
| 2017/0111185 A1* | 4/2017 | Yamaguchi | H04L 12/46 |

FOREIGN PATENT DOCUMENTS

| | | |
|---|---|---|
| WO | 2008/108699 A1 | 9/2008 |
| WO | 2009/055716 A1 | 4/2009 |
| WO | 2010/127365 A1 | 11/2010 |
| WO | 2010/141714 A2 | 12/2010 |
| WO | 2010/141714 A3 | 12/2010 |
| WO | 2011/053008 A2 | 5/2011 |
| WO | 2011/062341 A1 | 5/2011 |
| WO | 2014/187601 A1 | 11/2014 |
| WO | 2016/083580 A1 | 6/2016 |
| WO | 2017/093223 A1 | 6/2017 |
| WO | 2017/114788 A1 | 7/2017 |

OTHER PUBLICATIONS

European Patent Office, Extended European Search Report for EP Pat. App. No. 15202800.7, dated Jun. 8, 2016.
European Patent Office, Extended European Search Report for EP Pat. App. No. 15202824.7, dated Jun. 17, 2016.
International Searching Authority, International Search Report and Written Opinion for PCT Pat. App. No. PCT/EP2016/079083, dated Jan. 10, 2017.
International Searching Authority, International Search Report and Written Opinion for PCT Pat. App. No. PCT/EP2016/082563, dated Mar. 22, 2017.
International Searching Authority, International Search Report and Written Opinion for PCT Pat. App. No. PCT/EP2016/082528, dated Apr. 3, 2017.
M. Schenk et al., Method afor Device-to-Device Communication Between a Local Device and a Remote Device,U.S. Appl. No. 15/779,331, filed May 25, 2018.
M. Schenk et al., Method and System for Controlling Access for a User Equipment to a Local Device, U.S. Appl. No. 16/065,116, filed Jun. 21, 2018.
Third Generation Partnership Project, 3GPP TS 23.402 V13.3.0 Technical specfication group services and system aspects; Architectural enhancements for non-3GPP accesses (Release 13), Sep. 17, 2015.
Third Generation Partnership Project, 3GPP TS 23.703 V1.1.0 "Technical specfication group services and system aspects; Study on architecture enhancement to support Proximity-based Service (ProSe) (Release 12)", Jan. 28, 2014.

* cited by examiner

ESTABLISHMENT OF A CONNECTION BETWEEN TWO LOCAL DEVICES CONNECTED TO DIFFERENT NETWORKS

CROSS REFERENCE TO RELATED APPLICATIONS

This application is a national stage entry of, and claims priority to, PCT Pat. App. No. PCT/EP2016/082528, filed Dec. 23, 2016, which claims priority to European Pat. App. No. 15202824.7, filed Dec. 28, 2015, all of which are fully incorporated herein by reference for all purposes.

FIELD OF THE INVENTION

The invention relates to methods for controlling an ability of a user equipment to instruct establishment of a connection between two local devices. The invention further relates to a user equipment and intermediary system for use in such methods.

BACKGROUND OF THE INVENTION

The amount of devices that is able to connect to the Internet of Things is expected to grow enormously. It is estimated that by the year 2020 50 billion devices will be connected. Therefore, it is no surprise that industry efforts and investments are directed towards this field. The new generation of mobile systems, 5G, is expected to bring new network and services capabilities. One aspect of the new capabilities relates to device-to-device (D2D) communication.

In a previous application of the applicants, European patent application 15197013.4, a method is described that enables a user equipment to access a local device connected to a local network, even if the user equipment is not connected directly to the local network, but is connected to a public network. The method involves an intermediary system that is configured to connect to the local network and to the public network and comprises the steps in the intermediary system of connecting to the local network and storing a device identifier of the at least one local device in the local network. The method further comprises connecting to the public network and transmitting profile information for the user equipment enabling the user equipment to present a representation of the local device in the local network. The profile information comprises the device identifier. The representation on the user equipment may be such that to a user of the user equipment and/or to applications running on the user equipment, the user equipment appears to be directly connected to the local network.

A problem may occur, however, when a user equipment tries to initiate a service of a local device that requires a connection with another local device. An example of initiating such a service would be instructing a television to play a video stream from a security camera. As a result of the above described method, to the user equipment it may seem as if the user equipment, the television and the security camera are all connected to one local network. However, in reality this may not be the case, which may cause a problem when instructing the television to play the video stream from the security camera.

SUMMARY

It is an object of the present invention to present a method for controlling an ability of a user equipment to instruct establishment of a connection between two local devices, that overcomes the above described problem.

Therefore, one aspect of the disclosure relates to a method in a user equipment for instructing establishment of a connection between a first local device and a second local device, the user equipment being connected to a public network, wherein an intermediary system is configured to connect to a first local network, to a second local network and to the public network and wherein the first local device is connected to the first local network and the second local device is connected to the second local network. The first local device and the second local device are configured to connect over a communication path. The method comprises generating, at the user equipment, a virtual view comprising a first representation of the first local device in the first local network and a second representation of the second local device in the second local network. A selection is then received of the first representation in the virtual view. Upon selecting the first representation, connectivity information is obtained regarding the communication path between the first local device and the second local device. An ability for a user of the user equipment is then enabled or disabled to instruct establishment of the connection over the communication path between the first local device and the second local device in dependence of the connectivity information and in response to receiving the selection of the first representation in the virtual view.

Another aspect of the disclosure relates to a user equipment configured to instruct establishing of a connection between a first local device and a second local device, the user equipment being configured to connect to a public network. An intermediary system is configured to connect to a first local network, to a second local network and to the public network. The first local device is connected to the first local network and the second local device is connected to the second local network, wherein the first local device and the second local device are configured to connect over a communication path. The user equipment comprises a processor configured to generate a virtual view comprising a first representation of the first local device in the first local network and a second representation of the second local device in the second local network. The processor is configured to process a selection of the first representation in the virtual view and to obtain connectivity information regarding the communication path between the first local device and the second local device. The processor is configured to enable or disable an ability for a user of the user equipment to provide an instruction over the public network to establish the connection over the communication path between the first local device and the second local device in dependence of the connectivity information and in response to processing the selection of the first representation in the virtual view.

Yet another aspect of the disclosure relates to a method in an intermediary system for establishing a connection over a communication path between a first local device connected to a first local network and a second local device connected to a second local network. The intermediary system is configured to connect to the first local network, to the second local network and to a public network. The method comprises transmitting connectivity information regarding the communication path between the first local device and the second local device over the public network to the user equipment and receiving an instruction from the user equipment based on the connectivity information to establish the connection over the communication path. The connection is established over the communication path based on the received instruction. Updated connectivity information regarding the established connection over the communication path is obtained and transmitted to the user equipment.

Yet another aspect of the disclosure relates to an intermediary system configured for executing the methods in the intermediary system according to this disclosure.

The applicants have realized that in order to prevent a problem when a user or application tries to use a service provided by two local devices in different local networks, the ability to instruct establishment of a connection over the communication path may be dependent on connectivity information regarding the communication path between the first local device and the second local device. The method enables that only instructions to connect over the communication path can be sent in case a suitable communication path for a service exists between the first and second local device, thereby providing a user-friendly connection control to the user.

The first and/or second local networks may comprise a local area network comprising wired Ethernet connections and/or wireless connections with local devices, for example over WiFi, Bluetooth or ZigBee. This includes so-called ad hoc modes or peer-to-peer connections without a network infrastructure in between.

The public network may comprise a network of a Mobile Network Operator (MNO).

The intermediary system may be configured to connect to the public network via a base station, such as a(n) (e)NodeB. It should be appreciated that this base station may be a base station in the local network. This type of base station is called a home (e)NodeB or femtocell. The home (e)NodeB is normally used to improve indoor coverage of the public network and the user equipment and/or the intermediary system can connect to the public network by connecting to the home (e)NodeB. It should be appreciated that the intermediary system may be integrated with a home (e)NodeB or femtocell as described above. The intermediary system may also be configured to connect to the public network using the 3GPP Generic Bootstrapping Architecture (GBA) or other 3GPP standardized technologies (ref 3GPP TS 23.402) that allow the use of other radio technologies, such as WiFi or other wired networks. These technologies may comprise connecting via a secure tunnel to the public network using any kind of radio technology or wired technology. To the public network, the intermediary system may behave as if connected using the regular 3G/4G/5G radio network.

The intermediary system may be configured to set up a secure connection with the user equipment. The secure connection may be an encrypted tunnel. The first and/or second profile information may be transmitted over the secure connection between the intermediary system and the user equipment in the public network. Alternatively, the intermediary system may be directly addressable over the public network by its IP address. Another way to connect the intermediary system with the user equipment may be to set up an IP connection as per European patent application 14195052.7. Yet another way to send information between the user equipment and the intermediary system is to make use of a service provided by the public network that will route information between the user equipment and intermediary system based on the fact that both the user equipment and the intermediary system are known in the public network (similar to how a femtocell and a user equipment are presently known to a public network) and that the public network can route traffic between any two endpoints known to the public network.

The intermediary system may have a formal identity in the public network. The intermediary system may e.g. comprise an International Mobile Equipment Identity (IMEI), an International Mobile Subscriber Identity (IMSI) or an MSISDN. The intermediary system may comprise a Subscriber Identity Module, (SIM), UMTS Subscriber Identity Module (USIM) or IMS Subscriber Identity Module (ISIM). The intermediary system may also comprise a secure storage space for identity credentials, such as the Universal Integrated Circuit Card (UICC). The intermediary system may comprise a public network interface, such as a 3G/4G/5G radio interface.

It should be appreciated that the first representation may be generated based on first profile information of the first local device and that the second representation may be generated based on second profile information of the second local device. The first and second profile information may be received via the public network from the intermediary system. Methods for generating the representations in the virtual view are described in European patent application 15197013.4.

It should be appreciated that the virtual view and the first and second representations may be presented to a user of the user equipment and/or to an application running on the user equipment and may be such that, to the user and/or to the application, the user equipment appears to be directly connected to the first and/or the second local network. The virtual view and the first and/or second representations may be obtained by an application installed and executed on the user equipment. The virtual view and the first and/or second representations may also be obtained by creating a network overlay in the public network specific to that user equipment.

It should be appreciated that a part of the intermediary system may be implemented in the public network, such as a registry in the public network that may be configured to store the first and/or second profile information. The registry may be configured to transmit the profile information to the user equipment.

Examples of the communication path between the first local device and the second local device include a path via the intermediary system, for example between a first and a second intermediary device, a connection via the public network, a direct connection, such as a Zigbee, Bluetooth or WiFi connection.

It should be appreciated that the processing/receiving the selection of the first representation may be in response to a user interaction with the virtual view, for example the user selecting the first representation from a displayed list of representations. Processing or receiving the selection of the first representation may also be in response to an interaction of an application installed and executed on the user equipment with the virtual view, wherein the application may select the first representation. An example of an interaction of an application with the virtual view is the following. Assume that the virtual view comprises the representation of the first local device, which is a television, and that the virtual view further comprises a representation of a refrigerator. Suppose that a user now starts an application on the user equipment by which televisions can be controlled. The application may then filter the virtual view so that only relevant representations are displayed, in this example only the representation of the television is left. Hence, in the application only the representation of the television is shown to the user. The representation of the refrigerator is absent in the virtual view. Another possibility is that the first representation is selected in response to more than one interaction with the virtual view. It may for example be that after initiation of the above described application, two representations of two televisions are left in the virtual view and that both are presented to a user. Then the user may interact again with the virtual view and select one of these representations. It should be appreciated that receiving a selection may also be in response to an operating system interacting with the virtual view.

In an example, the connectivity information may indicate whether or not a communication path between the first local device and the second local device exists. The connectivity information may also simply indicate that the first local device and the second local device are not connected to the same local network. It should further be appreciated that the connectivity information may relate to a default connectivity information. The connectivity information may also comprise historical connectivity information regarding the communication path, for example connectivity information relating to a previous connection over the communication path. It may also be that the connectivity information comprises updated connectivity information. The connectivity information may be received from the intermediary system. In particular, the method in the user equipment may comprise transmitting to the intermediary system a request for the connectivity information and receiving the connectivity information from the intermediary system. It may also be that the intermediary system, in response to the received request for the connectivity information, establishes a test connection over at least part of the communication path in order to obtain the connectivity information.

It should further be appreciated that establishing the connection over the communication path may comprise requesting connectivity using connection management mechanisms such as MultiProtocol Label Switching (MPLS) and the Resource Reservation Protocol (RSVP) (in case of IP networks). The connectivity information may be requested from at least one of the public network, the first local network and the second local network.

It should be noted that in this disclosure, considerations regarding the measures of the methods performed in the user equipment also apply to the corresponding measures in the user equipment. Similarly, considerations regarding the measures of the methods performed in the intermediary system also apply to the corresponding measures in the intermediary system.

In one embodiment enabling or disabling the ability for the user comprises granting or denying access to the second representation in the virtual view. This embodiment is advantageous, because based on the obtained connectivity information, the virtual view may be filtered so that the virtual view only comprises representations of local devices for which the ability for a user to provide an instruction to establish the connection over the communication path is enabled. It should be appreciated that the ability may be enabled by granting access to the second representation and disabled by denying access to the second representation. Denying access to the second representation may comprise removing the second representation from the virtual view. This may prevent that a user tries to provide the instruction for the first and/or second local device to connect over the communication path, simply because the user cannot select the second representation. Denying access to the second representation may also comprise adding an indication to the virtual view that access to the second representation has been denied. In this case, the user may still see the second local device, but is aware that the ability is disabled. An example of such an indication for a user may be that the second representation is "greyed out" in a displayed list of representations.

In one embodiment, the connectivity information comprises the connection quality of the communication path and wherein the ability of the user is dependent on the connection quality meeting a quality threshold (the quality threshold may be non-zero, which would be the case if no network connection would exist between the first local device and the second local device) associated with at least one of the first local device and the second local device. An advantage of this embodiment is that it enables guaranteeing that a requested service provided by any two local devices represented in the virtual view is delivered at a certain quality. The quality of the connection may for example relate to a transmission rate and/or a latency and/or an encryption requirement and/or a frame loss rate associated with the connection. It should be appreciated that the quality threshold may relate to at least one of the first and second local device in the sense that it relates to an application executed on one of these devices. Hence a user equipment may be associated with more than one quality threshold, e.g. one quality threshold for each application.

In one embodiment the intermediary system comprises a first intermediary device and a second intermediary device, the first intermediary device being configured to connect to the first local network and the second intermediary device being configured to connect to the second local network. The communication path comprises a path between the first intermediary device and the second intermediary device. This embodiment enables the method to be performed when the first and second local network are remote from each other. It should be appreciated that each of the first and second intermediary device may each comprise all features of the intermediary system described above. It should be appreciated that the connectivity information may be received by the user equipment from the first intermediary device and/or the second intermediary device. In this embodiment the connectivity information may relate to the first and second local device being connected to or registered in different intermediary devices, in particular the connectivity information may indicate that the first local device is connected to the first intermediary device and that the second local device is connected to the second intermediary device. To this end, the user equipment may be configured to obtain an identifier of the first local device, an identifier of the second local device, an identifier of the first intermediary device and an identifier of the second intermediary device. The user equipment may then further be configured to associate the identifier of the first local device with the identifier of the first intermediary device, and to associate the identifier of the second local device with the identifier of the second intermediary device. In an example, the user equipment receives from the first intermediary device first profile information comprising the identifier of the first local device and the identifier of the first intermediary device. Based on this, the user equipment may associate the identifier of the first local device with the identifier of the first intermediary device, and may hence obtain connectivity information indicating that the first local device is connected to the first intermediary device. Similarly the connectivity information indicating that the second local device is connected to the second intermediary device may be obtained. In another example the user equipment is configured to store a list associating identifiers of local devices with identifiers of intermediary devices. Then, the user equipment may only receive the identifier of the first and/or second local device and associate herewith the identifier of the first and/or respective second intermediary device based on this list. The path between the first and second intermediary device may enable an internet connection, a direct connection over the public network, or another direct connection, such as a Zigbee, Bluetooth or WiFi connection.

In one embodiment the method comprises obtaining updated connectivity information from the intermediary system associated with the communication path and enabling or disabling the ability for the user in dependence of the updated connectivity information.

This embodiment enables that connectivity information based on which the ability is enabled or disabled is not static but may change. Updated connectivity information may for example be obtained and transmitted by the intermediary system, for example because a test connection over at least part of the communication path has been established.

In one embodiment the method further comprises instructing the intermediary system to establish the connection over the communication path by reconfiguration of one or more firewalls associated with at least one of the first local network and the second local network. The embodiment enables that the connection may be established, irrespective of whether the first and/or second local devices are behind one or more firewalls. It should be appreciated that the firewalls may be reconfigured according to a method described in EP14195052.7/PCT/EP2015/077932. A firewall may be a component that aims to ensure that the local devices behind that firewall are protected against cyber-attacks, such as port scans, login attempts, etc. and against unsolicited data. Effectively a firewall may block any communication to a local device if the local device did not initiate these communications itself. In other words, a firewall may prevent incoming connections to the first and/or second local devices. Therefore, a firewall may need to be reconfigured if a local device is protected by or, as said in the art, is 'behind' such a firewall and the local device would like to receive connections from another device not behind the same firewall. Reconfiguring the firewall may comprise informing the firewall that the communication path between the first and second local device is to be established.

In one embodiment the method comprises enabling or disabling the ability for the user to establish the connection in dependence of further access conditions associated with at least one of the user equipment, the first local device and the second local device. This embodiment enables great flexibility regarding the basis on which the ability is enabled or disabled. Any parameter relating to the user equipment, the first local device and/or the second local device may be taken into account, such as a battery charge, a location, a type of subscription, a remaining quantity of data that may be consumed according to the subscription, et cetera.

In one embodiment one or more further first local devices are connected to the first local network. The method further comprises generating the virtual view comprising one or more further first representations of the one or more further first local devices and obtaining further connectivity information comprising information that the one or more further first local devices are connected to the first local network. The connectivity information comprises information that the second local device is connected to the second local network. In response to receiving the selection of the first representation in the virtual view and in dependence of the connectivity information and the further connectivity information, the user is enabled to provide an instruction over the public network to establish a connection between the first local device and the one or more further first local devices and the user is disabled to provide an instruction over the public network to establish the connection over the communication path between the first local device and the second local device.

As described above, the connectivity information may relate to the first and second local device being connected to or registered in different intermediary devices. Similarly, the further connectivity information may relate to the first and the one or more further first local devices being connected to or registered in the same intermediary device, in particular to the first intermediary device. This embodiment is advantageous because it enables that the ability is simply enabled or disabled based on whether local devices are connected to the same local network or not.

In one embodiment the intermediary system comprises a first intermediary device and a second intermediary device, the first intermediary device being configured to connect to the first local network and the second intermediary device being configured to connect to the second local network, and wherein establishing the connection over the communication path comprises connecting the first and second intermediary device based on the received instruction from the user equipment. This embodiment is advantageous in situations wherein the first and second local network are remote from each other.

In one embodiment obtaining the connectivity information and/or updated connectivity information comprises information relating to one or more firewalls associated with at least one of the first local network and the second local network. This embodiment is advantageous when the first and/or second local device is behind one or more firewalls.

In one embodiment the method in the user equipment further comprises and/or the processing means in the user equipment are further configured for presenting the connectivity information on a display of the user equipment. This enables a user of the user equipment to decide whether or not he wishes to provide the instruction to establish the connection based on the connectivity information.

Another aspect of the invention relates to a computer program or suite of computer programs comprising at least one software code portion or a computer program product storing at least one software code portion, the software code portion, when run on a computer system, being configured for executing any of the above-described methods.

As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the users computer, partly on the users computer, as a stand-alone software package, partly on the users computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In one aspect, embodiments of the present invention may relate to a computer-implemented method according to any of the above-described methods.

Moreover, a computer program for carrying out the methods described herein, as well as a non-transitory computer readable storage-medium storing the computer program are provided. A computer program may, for example, be downloaded (updated) to the existing systems (e.g. to the existing user equipment 1, intermediary system 8, intermediary device 8*a* and/or intermediary device 8*b*) or be stored upon manufacturing of these systems.

Embodiments of the present invention will be further illustrated with reference to the attached drawings, which schematically will show embodiments according to the invention. It will be understood that the present invention is not in any way restricted to these specific embodiments.

BRIEF DESCRIPTION OF THE DRAWINGS

Aspects of the invention will be explained in greater detail by reference to exemplary embodiments shown in the drawings, in which.

DETAILED DESCRIPTION OF THE DRAWINGS

Figure 1:
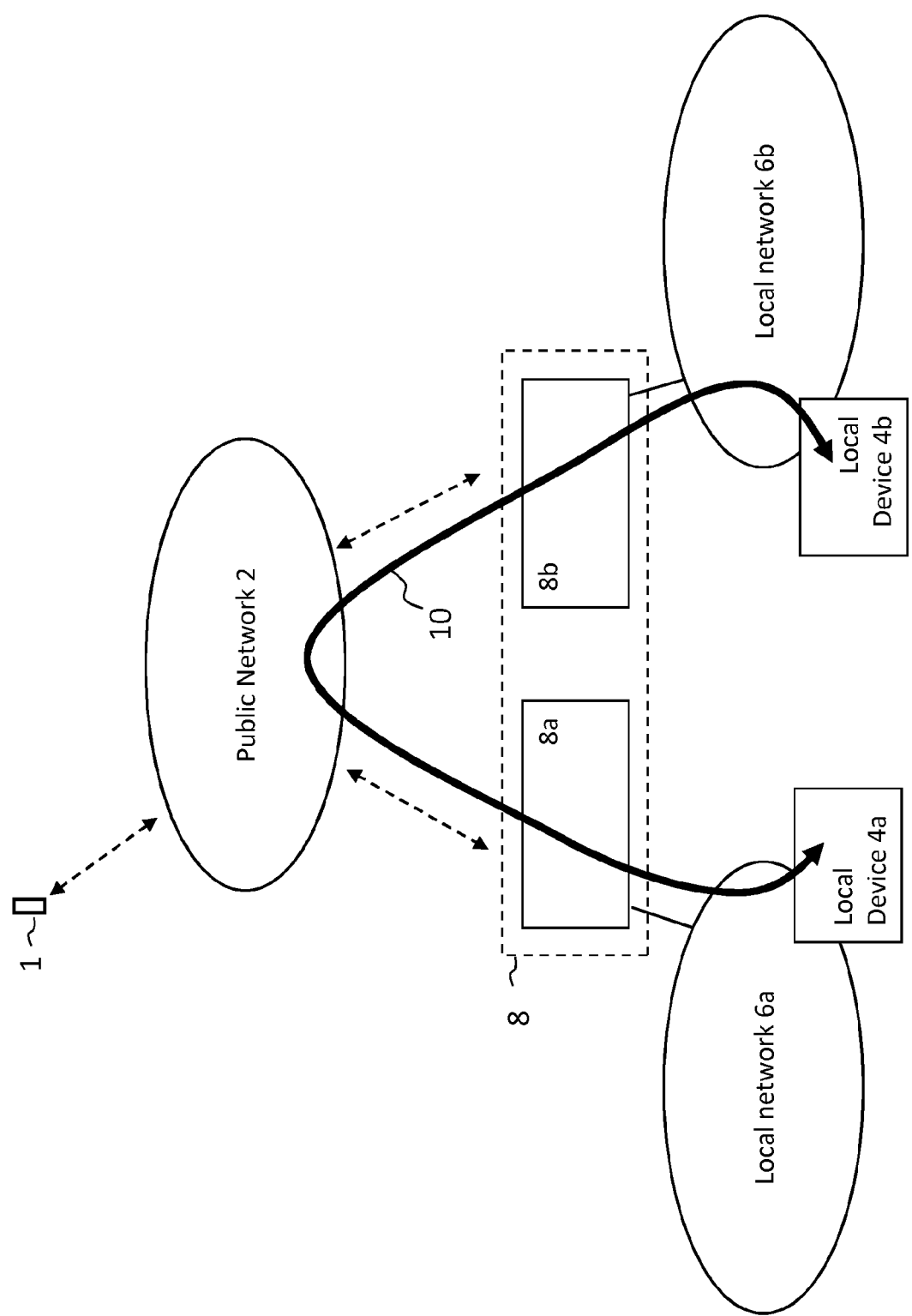
FIG. 1 shows an embodiment of a system wherein a user equipment is connected to local devices in separate local networks via an intermediary system.

FIG. 1 shows an embodiment of a system wherein a user equipment 1 is connected to public network 2. The user equipment 1 may be a mobile phone, or any other device that can connect to a public network. It should be noted that the user equipment 1 may connect to the public network through a base station of the public network, such as an (e)NodeB or a home (e)NB (not shown). The user equipment 1 may also connect to the public network 2 by other means, such as WiFi access points, or via a wired network, or via an optical wireless communications network or even through another public network that is connected to the public network, for example when the user equipment is roaming. Another example would be that the user equipment 1 is connected to a so-called femtocell associated with the public network 2. In a typical situation, the public network 2 is a network of a mobile network operator and the user of the user equipment 1 has purchased a subscription from the mobile network operator in order to connect to the public network. Local device 4a is connected to local network 6a and local device 4b is connected to local network 6b. Local network 6a and 6b may for example be local area networks (LANs). Local device 4a and local device 4b may be any device that is configured to connect to a local network. Examples of such local devices include televisions, desktop computers, tablet computers, mobile phones, but also refrigerators, sound systems, thermostats, cameras, et cetera. In the future, due to the development of the Internet-of-Things, a great variety of devices is expected to be connected to local networks.

Intermediary system 8 may comprise a first intermediary device 8a and a second intermediary device 8b. The intermediary system 8 is connected to the local network 6a, to the local network 6b and to the public network 2. In this example, the intermediary device 8a is connected to the local network 6a and to the public network 2 and intermediary device 8b is connected to local network 6b and public network 2. The intermediary system 8, intermediary device 8a and/or 8b may for example be provided by a mobile network operator to a subscriber and be installed in the subscriber's home after which the intermediary system 8 and/or intermediary devices 8a and 8b are able to connect to the local networks 6a and 6b and the public network 2 as depicted.

It should be appreciated that the intermediary system 8, the intermediary device 8a and/or the intermediary device 8b are connected to the public network 2 similar to how the user equipment 1 may be connected to the public network 2 described above. The intermediary system may also be connected to the public network via a home (e)NodeB, or femtocell, as described above, wherein the home (e)NodeB may be integrated with the intermediary system. The intermediary system 8 may have an identity in the public network 2. It should be appreciated that the intermediary devices 8a, 8b may be located remote from each other. Intermediary devices 8a, 8b may have different identities in the public network 2.

After the intermediary device 8a has connected to local network 6a, the intermediary device 8a may search for local devices that are also connected to the local network 6a. Similarly, intermediary device 8b may search for local devices connected to local network 6b. Local devices may send Universal Plug 'n Play (UPnP) messages announcing their presence in the local networks 6a and 6b respectively. The intermediary system 8 and/or the intermediary devices 8a and 8b may be configured to capture these announcements and hence discover local device 4a in local network 6a and local device 4b in local network 6b. It should be appreciated that intermediary device 8a may communicate with local device 4a over local network 6a and the intermediary device 8b may communicate with local device 4b over local network 6b.

Indicated with 10 is a communication path between local devices 4a and 4b. The communication path 10 in this example goes through the intermediary system 8, but this is not a restriction. Local device 4a may for example be a television and local device 4b a security camera. The television 4a and the camera 4b may connect to each other, after which the television is able to present a video stream generated by the security camera.

User equipment 1 is configured to provide an instruction over the public network 2 to establish a connection between local device 4a and local device 4b. The instruction may be provided in the context of the user equipment 1 controlling local device 4a. In the above example, the user equipment 1 may instruct the television to show a video stream of the security camera. The instruction to establish a connection may be transmitted from the user equipment 1 to at least one of intermediary device 8a, intermediary device 8b, local device 4a and local device 4b. An embodiment of the present disclosure enables or disables an ability for a user to transmit this instruction.

Figure 2B:
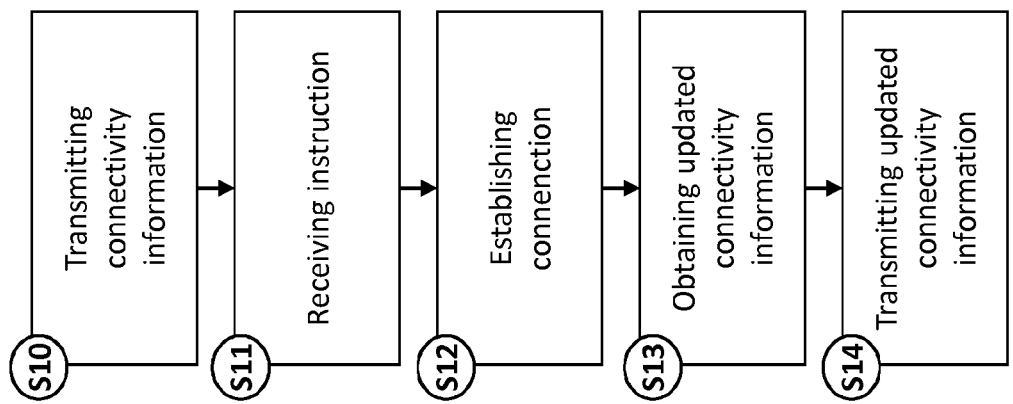
FIGS. 2A and 2B illustrate some steps of a method in a user equipment and in an intermediary system, respectively.
Figure 2A:
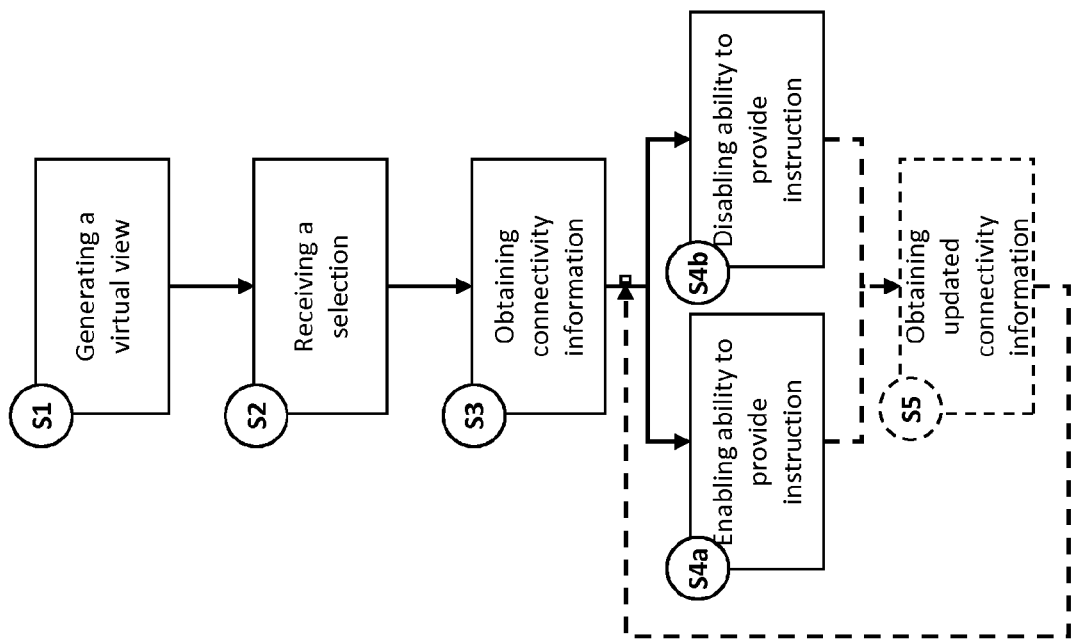

FIG. 2A shows steps performed in user equipment 1 according to an embodiment to enable or disable an ability to establish a connection between local devices.

Step S1 depicts generating a virtual view that comprises a representation of local device 4a in local network 6a and a representation of local device 4b in local network 6b. Intermediary device 8a may have obtained a device identifier, a state and/or an address of local device 4a, for example because the intermediary device 8a has received these via the local network 6a from local device 4a. In a similar manner, intermediary device 8b may have obtained a device identifier, state and/or an address of local device 4b. It should be appreciated that the state of a local device may relate to any parameter associated with the local device. The state may for example relate to a connection state of the local device indicating a state of the connection with a local network, or to an operational state, such as "on" or "off", or to a parameter that is specific to the local device, such as the temperature of a refrigerator or the sound volume of a sound system, or a state of a sensor device of a security system, e.g. "motion detected" or "door opened".

Obtaining the address of local device 4a and 4b may enable the respective intermediary devices 8a and 8b to route messages received over the public network 2 from the user equipment 1, e.g. instructions or control signals, to respective local devices 4a and 4b. It should be appreciated that the intermediary devices 8a, 8b may transmit obtained device identifiers, states and/or addresses of local devices 4a and 4b over the public network 2 to the user equipment 1 and that the user equipment 1 is configured to generate representations of the local devices 4a and 4b based on the information received from intermediary device 8a and 8b respectively. The representation may be presented on a display of and/or to an application running on the user equipment 1 and may indicate a state of a local device. Hence, the virtual view may comprise a convenient overview of local devices connected to local networks. In this example the virtual view comprises a representation of the local device(s).

Step S2 relates receiving and processing a selection of the representation of local device 4a. In the example wherein local device 4a is a television and local device 4b is a security camera, the representation of the television is selected. The virtual view may be presented on a display to the user of user equipment 1 and the user may select the television from the virtual view, for example by touching the representation of the television on a touch screen. It should be understood that the virtual view is not necessarily displayed on a display. It may also be that the virtual view is generated and stored on the user equipment. Processing means in the user equipment may then receive and process the selection of the representation from, for example, an application that is running on the user equipment 1. It may be that the user has selected an application that allows the television to be controlled. In response, the application may automatically select from the virtual view the representation of the television(s) that may be controlled from the application.

Step S3 depicts obtaining connectivity information regarding the communication path 10 between local devices 4a and 4b. In the above example, the communication path 10 runs between the television and the security camera. It should be appreciated that the television may only be able to show a video stream from the security camera when a connection can be established over the communication path. In particular, it may be that the television is only able to show a video stream from the security camera, if the connection quality meets a certain quality threshold. For example, it may be that a certain bit rate is required for proper displaying a video stream from the security camera on the television. The connectivity information may be obtained from the intermediary system 8.

Step 4a and step 4b depict two possibilities that may occur in dependence of the obtained connectivity information. Step 4a involves enabling the ability for a user of the user equipment to provide an instruction over the public network to establish a connection over the communication path between the two local devices 4a and 4b. Step 4b involves disabling this ability. In the example, after step 4a or 4b, the user may or may not be able to instruct establishment of a connection between the television and the security camera. Enabling or disabling this ability may comprise granting or denying access to the representation of the security camera, as will be explained below in further detail.

Step S5 comprises an optional step in the user equipment 1 wherein updated connectivity information is obtained. It may for example be that the connection over the communication path has been established on the basis of current connectivity information and that updated connectivity information is obtained at a later stage. This updated connectivity information may be received from the intermediary system 8. Since the communication path may go via the intermediary system, and hence an attempt is made to establish the connection between the two local devices 4a, 4b via the intermediary system 8, the intermediary system 8 may be able to obtain this updated connectivity information. The intermediary system 8 may for example be configured to assess the bit rate associated with the connection and transmit this bit rate, or a derivative thereof, to the user equipment 1 over the public network 2. Based on this updated connectivity information, the above mentioned ability of the user may be enabled or disabled.

FIG. 2B shows steps according to an embodiment in the intermediary system 8.

Step S10 depicts transmitting connectivity information regarding the communication path between local device 4a and 4b over the public network 2 to the user equipment 1. It should be appreciated that the connectivity information may have been obtained by the intermediary system 8 by assessing a connection over the communication path 10 that was established at an earlier moment. At that time, the intermediary system 8 may have stored the connectivity information associated with the communication path (and, of course, associated with the connection over the communication path 10 at that time). In another example, the intermediary system 8 obtains the connectivity information in response to a request for the connectivity information received from the user equipment 1 over the public network 2. The request may be triggered by the selection of a representation of a local device 4a, 4b as shown in step S2 in FIG. 2A.

Then, in response to the received request, the intermediary system 8 may establish a test connection between the local devices 4a, 4b, and/or between the intermediary devices 8a, 8b. The intermediary system 8 may then obtain connectivity information associated with the test connection over the communication path 10, and hence associated with the communication path 10, and may transmit the obtained connectivity information to the user equipment 1. As a result of step S10, the user equipment 1 may obtain the connectivity information in step S3.

In step S11 the intermediary system 8 receives an instruction from the user equipment to establish a connection between local device 4a and 4b over the communication path 10, when the ability for a user to send this instruction from user equipment 1 has been enabled. Based on this received instruction, in step S12, the intermediary system 8 establishes the connection over the communication path 10. It should be appreciated that intermediary device 8a may already be connected to local device 4a via local network 6a. Intermediary device 8b may already be connected to local device 4b via local network 6b. Hence, the connection over the communication path may comprise establishing the connection between intermediary device 8a and intermediary device 8b, i.e. within intermediary system 8. It should be appreciated that the intermediary devices 8a and 8b may become connected via the public network 2. Step S13 depicts obtaining updated connectivity information regarding the established connection over the communication path. As described above, the intermediary system 8 may be configured to assess the (quality of the) connection, for example by obtaining a bit rate associated with the connection, and hence obtain updated connectivity information that is associated with the communication path and with the current connection over the communication path. In step S14, the intermediary system 8 transmits this updated connectivity information to the user equipment 1 over the public network 2. It should be appreciated that, as a result of step S14, the user equipment 1 may in step S5, see FIG. 2A, obtain updated connectivity information regarding the communication path 10.

Figure 3:
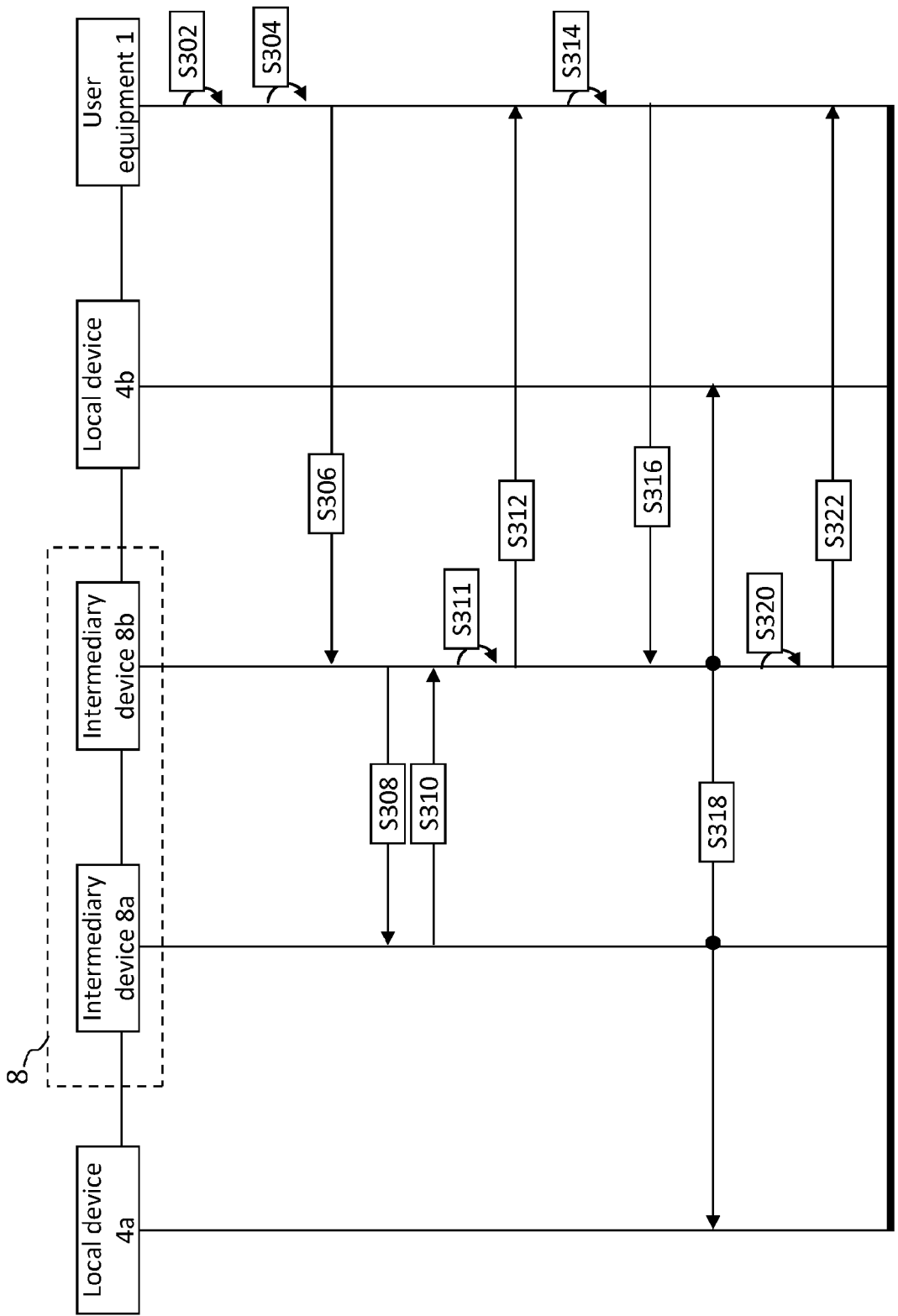
FIG. 3 is a time diagram illustrating steps for enabling or disabling an ability for establishing a connection between local devices in separate local network.

FIG. 3 is a time diagram depicting messages transmitted between, and processed in, local devices 4a and 4b, intermediary devices 8a and 8b and user equipment 1 of FIG. 1.

In step S302, the user equipment 1 generates a virtual view comprising two representations, one of local device 4a and one of local device 4b.

In step S304 the user equipment 1 receives a selection of the representation of local device 4a that is processed by the processor of the user equipment 1.

Next, the user equipment 1 obtains in steps S306-S312 the connectivity information regarding the communication path 10, depicted in FIG. 1.

It should be appreciated that these steps illustrate an example of how the connectivity information may be obtained. The connectivity information may be obtained in various ways. Another example would be that the user equipment 1 has stored a default and/or historic connectivity information regarding the communication path on storage means and that obtaining the connectivity information would comprise obtaining the stored connectivity information from a storage means.

In step S306 the user equipment 1 transmits to the intermediary system 8, in particular to intermediary device 8b, a request for connectivity information regarding communication path 10. In step S306 the intermediary system 8, in particular the intermediary device 8b, receives from user equipment 1 the request for the connectivity information. It should be appreciated that the user equipment 1 and the intermediary system 8 may communicate over the public network 2. In response to the received request for connectivity information, the intermediary device 8b initiates in step S308 a test connection with intermediary device 8a. Step S310 depicts the response, e.g. a response indicating a successful set-up of the test connection between the intermediary devices 8a and 8b. In step S311, the intermediary device 8b obtains connectivity information associated with the response, for example the speed of the test connection. The connectivity information is in step S312 transmitted from intermediary device 8b to user equipment 1. In step S312 the user equipment 1 receives from intermediary device 8b the connectivity information. Hence, in step S312 the user equipment 1 obtains the connectivity information regarding communication path 10.

Based on the received connectivity information, the user equipment 1 enables in step S314 an ability for the user of the user equipment to provide an instruction over the public network 2 to establish the connection over the communication path. In an example the connectivity information indicates that the connection between the intermediary device 8a and 8b was successfully established. Note that in the depicted example, the connectivity information regards a part of the communication path, namely the part between the two intermediary devices 8a and 8b.

In step S316 the user equipment transmits an instruction over the public network 2 to intermediary system 8, in particular to intermediary device 8b, to establish the connection over communication path 10. In step S316 the intermediary system 8, in particular the intermediary device 8b, receives the above mentioned instruction from the user equipment 1 over the public network.

In step S318 the intermediary system 8 establishes the connection between local device 4a and 4b. Note that in this step intermediary devices 8a and 8b are being connected. In the above example, wherein local device 4a is a television and local device 4b a security camera, a video stream from the security camera may now be transmitted over the established connection, so that the television may be enabled to display the video stream.

In step S320 the intermediary system 8, in particular the intermediary device 8b, obtains updated connectivity information. The updated connectivity information regards the established connection between the two local devices 4a and 4b and in step S322 the intermediary device 8 transmits this updated connectivity information to user equipment 1 over the public network 2. Subsequently the user equipment 1 may enable or disable the above described ability for a user based on this received updated connectivity information (not shown). User equipment 1 may also, based on the received updated connectivity information, provide an instruction over the public network to cease the connection over the communication path between local device 4a and local device 4b (not shown).

Figure 4:
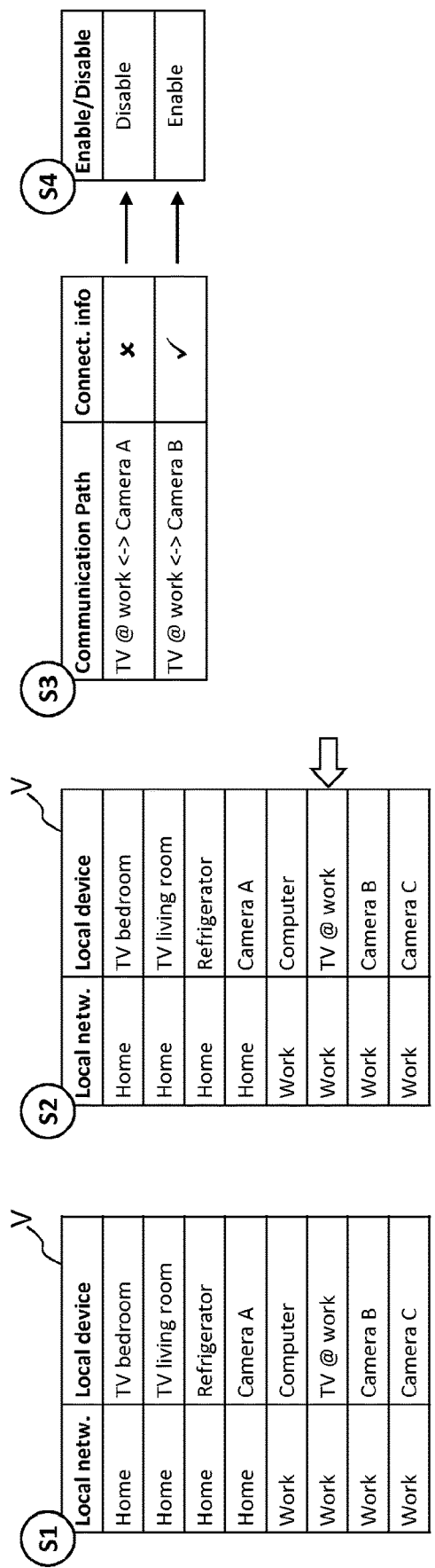
FIGS. 4-6 illustrate examples of virtual views in a user equipment.

FIG. 4 illustrates steps S1, S2, S3, S4a and S4b as described above with reference to FIG. 2A for controlling establishment of a connection between local devices in different local networks.

As explained, in step S1 the user equipment generates a virtual view V comprising the representations of local devices. In FIG. 4 illustrates that in step S1 a virtual view V is generated that comprises eight representations of eight local devices. Four of these local devices are connected to local network "Home" and four of these local devices are connected to local network "Work". It should be appreciated that the virtual view V may or may not be presented on a display to a user. Furthermore, FIG. 4 illustrates that in step S2 a selection of local device "TV @ work" is received. The selection is indicated by the arrow. "TV @ Work" is connected to local network "Work". It should be understood that in terms used above, local network "Work" is the first local network and "TV @ work" is the first local device. Local network "Home" is the second local network.

Step S3 illustrates two embodiments. In a first embodiment the above described second local device is "Camera A", which is a local device that is connected to local network "Home". Step S3 depicts that the connectivity information regarding a communication path between "TV @ work" and "Camera A" is obtained. The connectivity information comprises, as indicated by the cross mark, that the two devices are connected to different local networks. Hence, in step S4 the ability for a user to provide an instruction over the public network to establish the connection over the communication path between the "TV @ work" and "Camera A" is disabled.

A second embodiment is also illustrated in the depicted step S3. Herein, the second local device is "Camera B". Also, in step S3 the connectivity information regarding the communication path between "TV @ Work" and "Camera B" is obtained. The connectivity information comprises, as indicated by the check mark, that "TV @ work" and "Camera B" are both connected to the same local network, namely to local network "Work". Hence, the ability for the user to provide an instruction over the public network 2 to establish the connection over the communication path between "TV @ Work" and "Camera B" is enabled in step S4. Note that in these embodiments, the connectivity information regards the communication path between the first and second local device in the sense that the connectivity information comprises information on whether the first and second local device are connected to the same or to different local networks. In this example, the mere fact that the two local devices are connected to different networks results in disabling the above described ability for the user, whereas the fact that the two local devices are connected to the same local network leads to enabling the ability.

Figure 5:
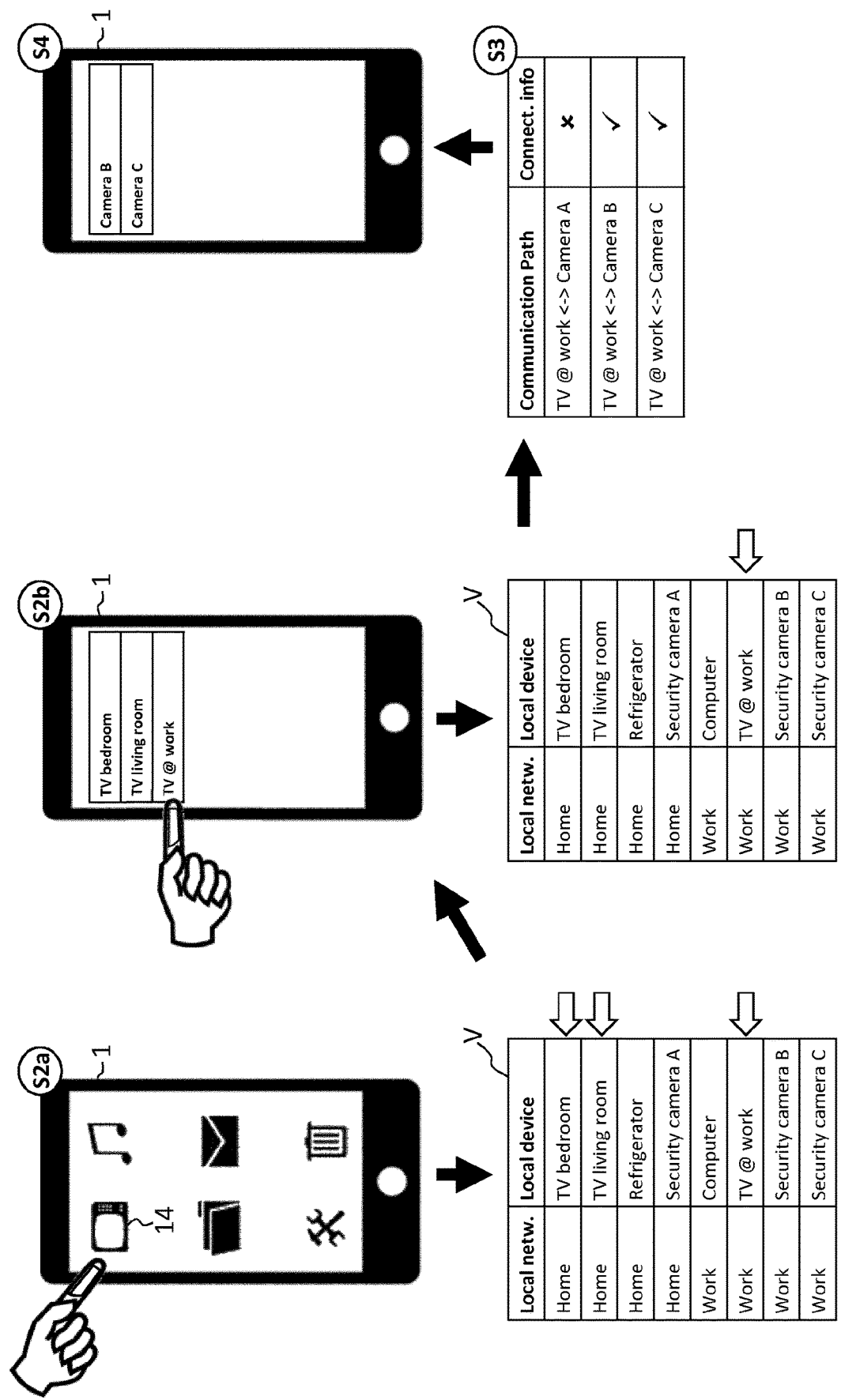

FIG. 5 illustrates steps S2, S3 and S4 in FIG. 2A in a different embodiment for controlling establishment of a connection between local devices in different local networks. Step S2 comprises two sub steps, namely step S2a and S2b. In the depicted example, the user equipment 1 is a smart phone with a touch sensitive display. FIG. 5 illustrates how the selection of the first local device may be received at the user equipment 1, and what may be presented to a user on the display of user equipment 1. In step S2a the user selects on a screen of the smart phone an application 14 with which televisions can be controlled. Since the user equipment 1 comprises a touch screen, the user may simply tap the icon 14 of the application. On the bottom left of the figure we see a virtual view in the user equipment 1. As indicated by the three arrows, the selection by the user of application 14 selects the representations in the virtual view V of those devices that can be controlled with the application. In this case the representation of three televisions are selected, namely "TV bedroom", "TV living room" and "TV @ work". Note that "TV bedroom" and "TV living room" are connected to local network "Home", whereas "TV @ work" is connected to local network "Work". The depicted user equipment 1 in step S2b shows what is displayed to the user after he has selected application 14. A part of the virtual view V is presented, namely the selected representations. In step S2b, the user selects "TV @ work" as the first local device. Apparently this is the television he wishes to control. The virtual view V in the bottom middle of the figure illustrates that now only one local device, namely "TV @ work" is selected, which completes step S2. Next, the user equipment 1 obtains connectivity information regarding communication paths between "TV @ work" on one side and "Camera A", "Camera B" and "Camera C" respectively on the other side. Hence, the figure illustrates three embodiments, wherein the second local device is either one of Camera A, B or C. The connectivity information again indicates whether the two local devices are connected to the same local network, which results in enabling the ability for the user, or to different local networks, which leads to disabling the ability for the user. As shown, the ability for the user to provide an instruction over the public network to establish the connection over a communication path between "TV @ work" and "Camera A" is disabled, while the ability for the user to provide an instruction over the public network to establish the connection over a communication path between "TV @ work" and "Camera B", or between "TV @ work" and "Camera C", is enabled. Note that as a consequence of this, access to the representation of Camera A is denied by not presenting the representation of Camera A to the user on the display of user equipment 1. Access to the representation of Camera B and C is granted by presenting these representations on the display to the user. The user may now select from which camera he wishes to see the video stream on his television at work.

Figure 6:
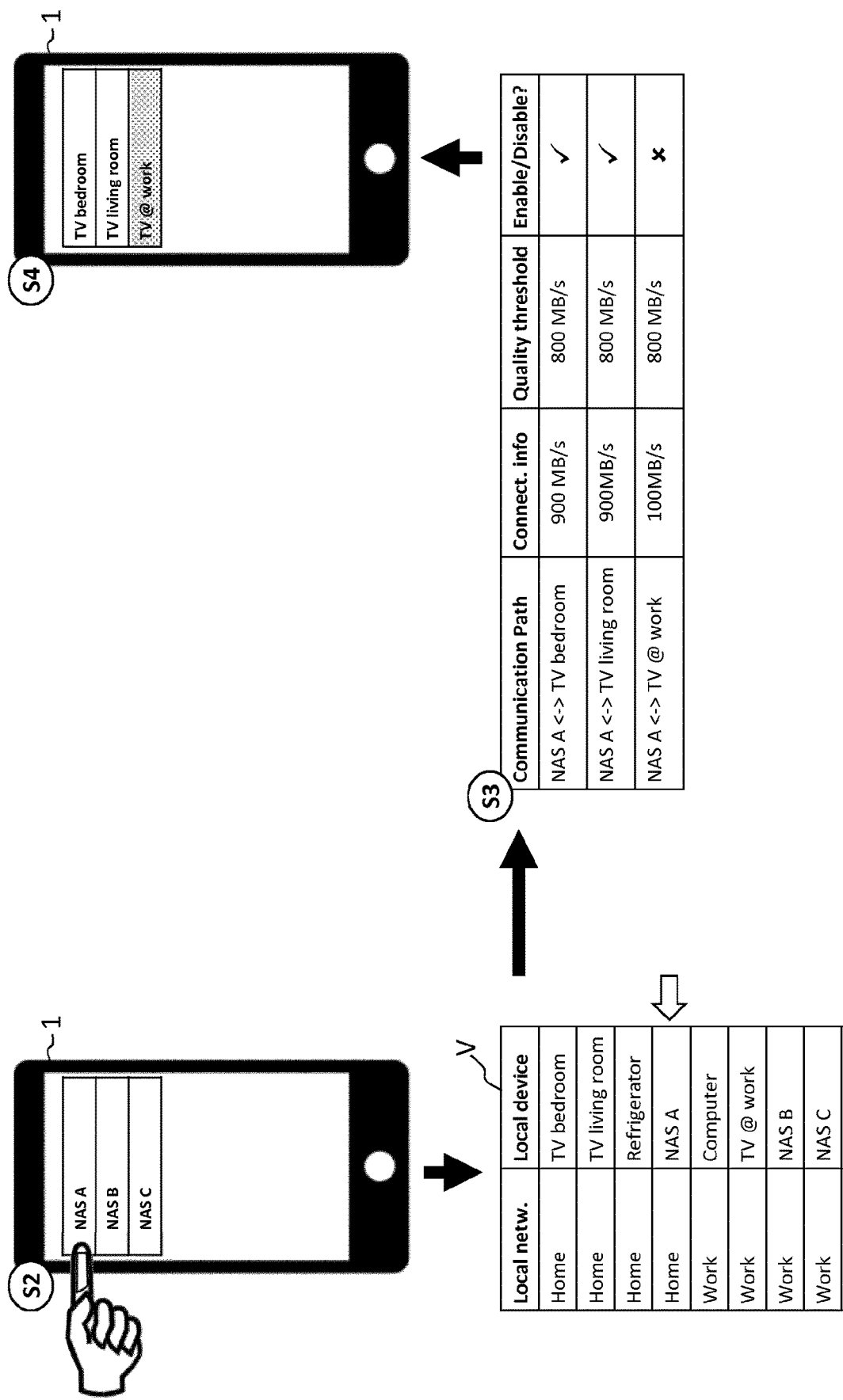

FIG. 6 illustrates yet another embodiment of controlling establishment of a connection between local devices in different local networks. The user equipment 1 in the top left displays part of a virtual view V. Three representations of three local devices are shown, namely of Network Attached Storage A (NAS A), NAS B and NAS C. NAS A is connected to local network "Home" and NAS B and NAS C are connected to local network "Work". As shown, in step S2 the user equipment receives a selection of the representation of NAS A. This is also indicated in the virtual view V in the bottom left by the arrow. In step S3, three embodiments are illustrated. In this step, connectivity information is obtained regarding the communication paths between NAS A and the three televisions in the virtual view. Note that in this step the user equipment makes a selection as to which local devices are configured to connect to NAS A. This is beneficial, because then no resources are wasted on obtaining connectivity information regarding a communication path between the refrigerator and NAS A. The connectivity information regarding the three depicted communication paths comprises a bit rate of a connection over at least part of the communication path. As explained above, the intermediary system 8 may have set up a test connection over the communication path and may have assessed the test connection in terms of bit rates. As shown, the connectivity information of the first two communication paths, the paths between NAS A on one side and "TV bedroom" respectively "TV living room" on the other side, indicate that a connection over at least part of these communication paths are associated with a bit rate of 900 MB/s. Similarly, the connectivity information regarding the third depicted communication path between NAS A and "TV @ work" indicate that a connection over the communication path is associated with a bit rate of 100 MB/s. Each communication path in this example is associated with a similar quality threshold, 800 MB/s. The first two communication paths meet this threshold, while the third communication path between NAS a and "TV @ work" does not meet this threshold. Hence the above described ability for the user is enabled with respect to "TV bedroom" and "TV living room" and disabled with respect to "TV @ work". Note that the ability with respect to "TV @ work" is disabled by denying access to the representation of "TV @ work" in the virtual view. The access in this example is denied by greying out the representation of the "TV @ work", so that the user cannot select the television at work for displaying content from NAS A. It should be appreciated that easily further access conditions may be defined that have to be met for enabling the ability for the user to provide an instruction to establish a connection between two local devices. An example is that with respect to "TV @ work" the ability for the user may only be enabled during working hours. Another example is that with respect to "TV living room" the ability may only be enabled if the user equipment 1 is within a certain distance from the intermediary system 8.

Figure 7:
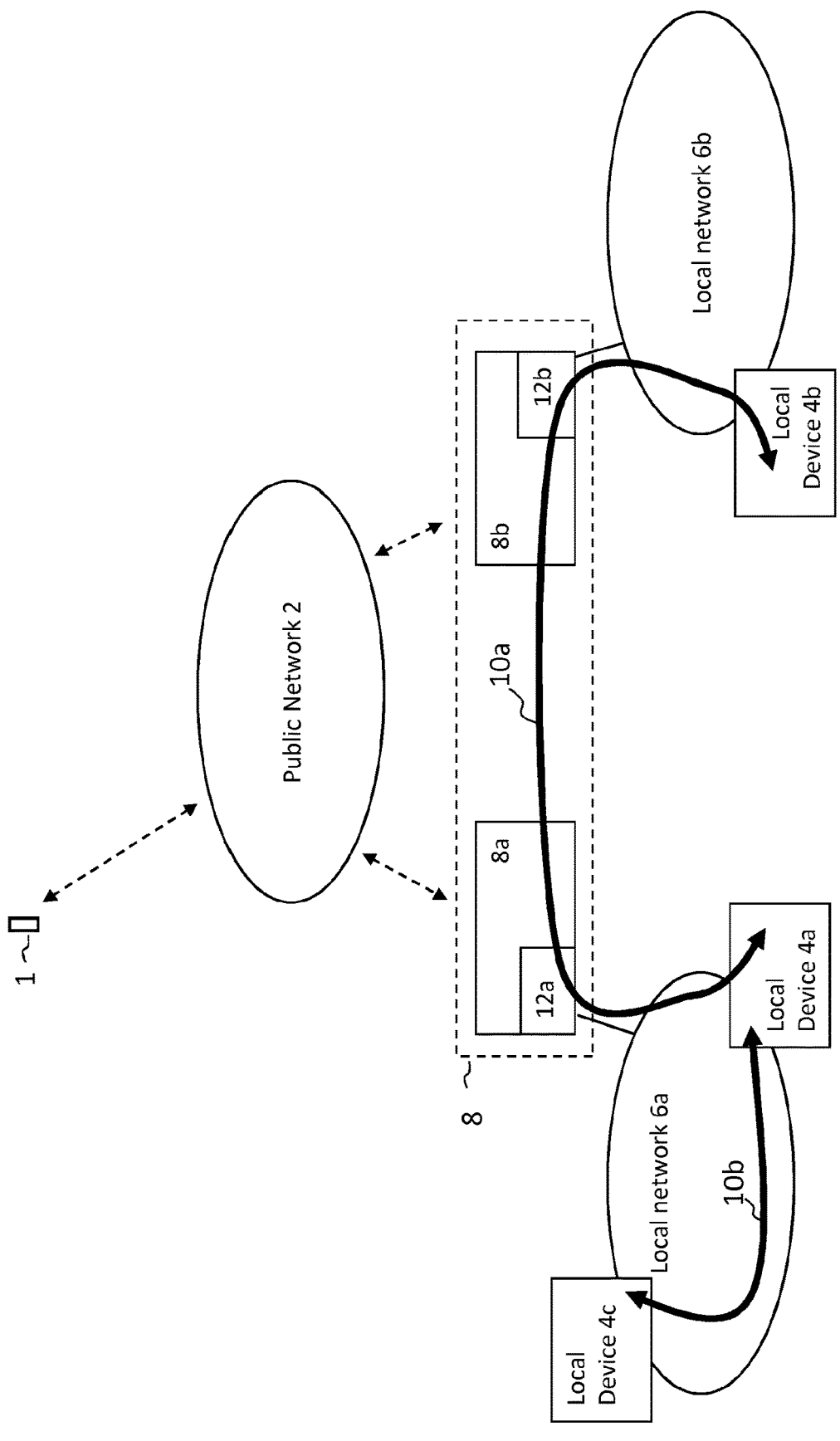
FIG. 7 depicts a further embodiment of a system wherein a user equipment is connected to local devices in separate local networks via an intermediary system.

FIG. 7 shows a an embodiment wherein the intermediary device 8a comprises a firewall 12a and wherein intermediary device 8b comprises a firewall 12b. It should be appreciated that these firewalls protect the local devices in the respective local networks as described above. Also shown are communication path 10a, which is the communication path between local device 4a and local device 4b. Note that this communication path 10a comprises a direct path between intermediary device 8a and intermediary device 8b. In this example, the public network 2 is not part of the communication path 10a. Communication path 10a may comprise a direct connection, such as a Zigbee, Bluetooth or WiFi connection. Communication path 10b is the path between local device 4a and local device 4c. It should be appreciated that this path may also comprise a direct connection, such as a Zigbee, Bluetooth or WiFi connection, but may also be part of local network 6a.

The connectivity information and/or updated connectivity information regarding communication path 10a that the intermediary system 8 obtains may comprise information relating to firewall 12a and/or firewall 12b. The connectivity information may for example indicate whether firewalls 12a and/or 12b can be configured to allow a connection between local devices 4a and 4b. In another embodiment the connectivity information and/or updated connectivity information regarding communication path 10a may indicate that local device 4a and local device 4b are connected to different local networks. Based on this, the ability for the user to provide an instruction over the public network to establish the connection over the communication path 10a may be disabled. Similarly, the connectivity information and/or updated connectivity information regarding communication path 10b may indicate that local device 4a and local device 4c are connected to the same local network. Based on this, the ability for the user to provide an instruction over the public network to establish the connection over the communication path 10b may be enabled.

Figure 8:
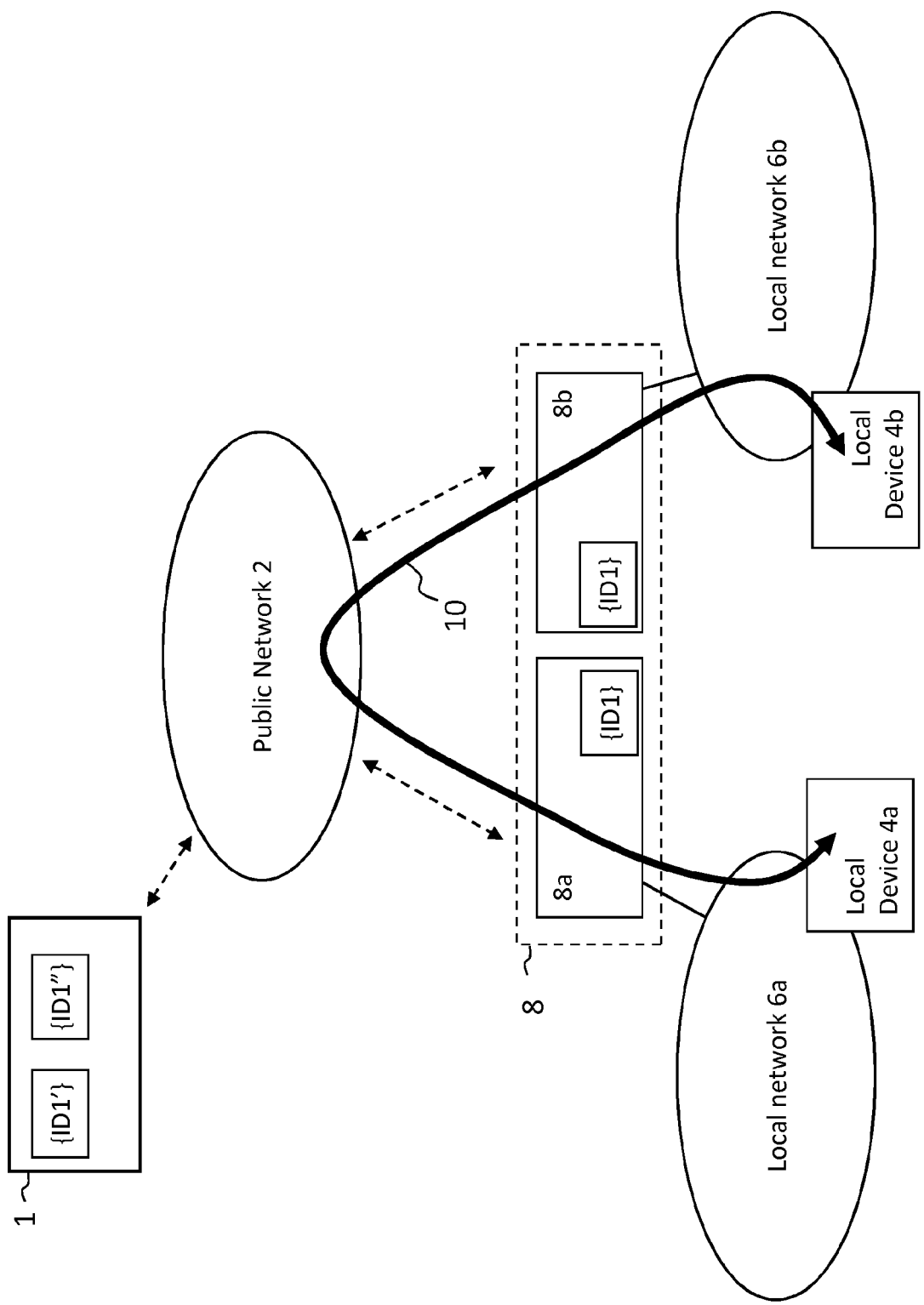
FIG. 8 illustrates an example of address translation the system of FIG. 1.

FIG. 8 depicts an embodiment wherein address translation is performed. As shown, intermediary device 8a has stored device identifier {ID1} that is associated with local device 4a. By coincidence, intermediary device 8b has stored the same local device identifier {ID1} associated with local device 4b. These identifiers may only be of local significance such as local IPv4 addresses (e.g. addresses in the 10.x.x.x or 192.168.x.x range). In that case, each of the intermediary devices 8a and 8b can distinguish the respective local devices 4a and 4b in respective local networks 6a and 6b. However, since the virtual view in the user equipment 1 comprises the two local devices 4a and 4b that are connected to different local networks, the local device identifiers {ID1} and {ID1} need to be translated into globally unique identifiers since, otherwise, the user equipment 1 is not able to distinguish between local device 4a and 4b. Hence, local device identifier {ID1} associated with local device 4a is translated into globally unique device identifier {ID1'} and local device identifier {ID1} associated with local device 4b is translated into globally unique device identifier {ID1"}. Hence the user equipment 1 can distinguish between the (representations of) local devices 4a and 4b. It should be appreciated that traditional mechanisms such as Network Address Translation (NAT) and Port Forwarding may be used for this purpose. It should be appreciated that instead of translating the local device identifiers {ID1} and {ID1} into globally unique identifiers, they may be translated such that the translated identifiers are unique within the user equipment 1, so that the user equipment can distinguish between the local devices.

Figure 9:
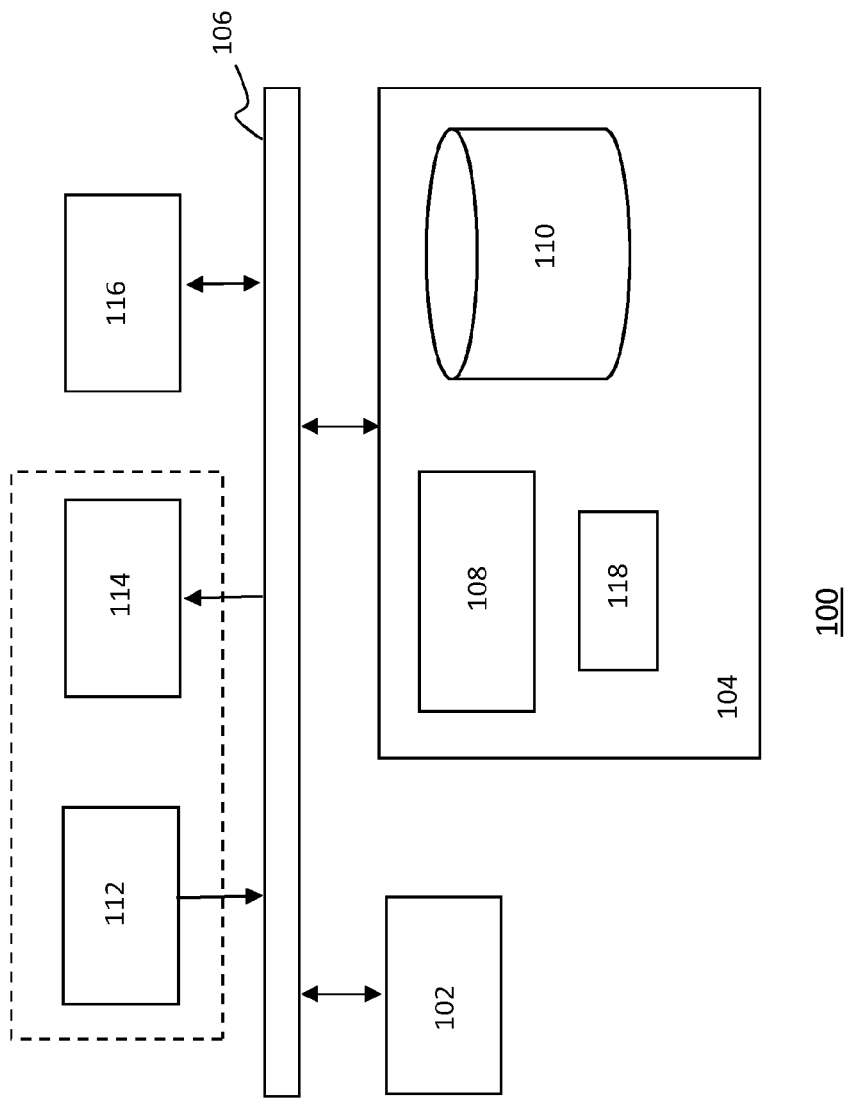
FIG. 9 is a schematic block diagram of a general system (e.g. a user equipment or an intermediary system) to be employed in the disclosed method.

FIG. 9 depicts a block diagram illustrating an exemplary data processing system that may be used in any of the above-described methods and/or intermediary system 8, intermediary device 8a, intermediary device 8b and/or user equipment 1.

As shown in FIG. 9, the data processing system 100 may include at least one processor 102 coupled to memory elements 104 through a system bus 106. As such, the data processing system may store program code within memory elements 104. Further, the processor 102 may execute the program code accessed from the memory elements 104 via a system bus 106. In one aspect, the data processing system may be implemented as a computer that is suitable for storing and/or executing program code. It should be appreciated, however, that the data processing system 100 may be implemented in the form of any system including a processor and a memory that is capable of performing the functions described within this specification.

The memory elements 104 may include one or more physical memory devices such as, for example, local memory 108 and one or more bulk storage devices 110. The local memory may refer to random access memory or other non-persistent memory device(s) generally used during actual execution of the program code. A bulk storage device may be implemented as a hard drive or other persistent data storage device. The processing system 100 may also include one or more cache memories (not shown) that provide temporary storage of at least some program code in order to reduce the number of times program code must be retrieved from the bulk storage device 110 during execution.

Input/output (I/O) devices depicted as an input device 112 and an output device 114 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 9 with a dashed line surrounding the input device 112 and the output device 114). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 116 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 100, and a data transmitter for transmitting data from the data processing system 100 to said systems, devices and/or networks. Modems, cable modems, and Ethernet cards are examples of different types of network adapter that may be used with the data processing system 100.

As pictured in FIG. 9, the memory elements 104 may store an application 118. In various embodiments, the application 118 may be stored in the local memory 108, the one or more bulk storage devices 110, or apart from the local memory and the bulk storage devices. It should be appreciated that the data processing system 100 may further execute an operating system (not shown in FIG. 9) that can facilitate execution of the application 118. The application 118, being implemented in the form of executable program code, can be executed by the data processing system 100, e.g., by the processor 102. Responsive to executing the application, the data processing system 100 may be configured to perform one or more operations or method steps described herein.

In one aspect of the present invention, the data processing system 100 may represent a user equipment 1, intermediary system 8, intermediary device 8a and/or intermediary device 8b as described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 102 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A method in a user equipment for instructing establishment of a connection between a first local device and a second local device, the user equipment being connected to a public network, wherein an intermediary system is configured to connect to a first local network, to a second local network and to the public network and wherein the first local device is connected to the first local network and the second local device is connected to the second local network, wherein the first local device and the second local device are configured to connect over a communication path, the method comprising:
    generating a virtual view comprising a first representation of the first local device in the first local network and a second representation of the second local device in the second local network;
    processing a selection of the first representation in the virtual view;
    obtaining connectivity information regarding the communication path between the first local device and the second local device; and
    enabling or disabling, in dependence of the connectivity information regarding the communication path and in response to processing the selection of the first representation in the virtual view, an ability for a user of the user equipment to provide an instruction over the public network to establish the connection over the communication path between the first local device and the second local device,
    wherein enabling or disabling the ability for the user comprises granting or denying access to the second representation in the virtual view.

2. The method according to claim 1, wherein the connectivity information comprises a connection quality of the communication path and wherein the ability of the user is dependent on the connection quality meeting a quality threshold associated with at least one of the first local device and the second local device.

3. The method according to claim 1, further comprising:
    obtaining updated connectivity information from the intermediary system associated with the communication path; and
    enabling or disabling the ability for the user in dependence of the updated connectivity information.

4. The method according to claim 1, further comprising:
    enabling or disabling the ability for the user in dependence of further access conditions associated with at least one of the user equipment, the first local device and the second local device.

5. The method according to claim 1, wherein one or more further first local devices are connected to the first local network, the method further comprising:
    generating the virtual view comprising one or more further first representations of the one or more further first local devices;
    obtaining further connectivity information comprising information that the one or more further first local devices are connected to the first local network and wherein the connectivity information comprises information that the second local device is connected to the second local network; and
    in response to processing the selection of the first representation in the virtual view and in dependence of the connectivity information and the further connectivity information:
        enabling the ability for the user to provide an instruction over the public network to establish a connection between the first local device and the one or more further first local devices, and
        disabling the ability for the user to provide an instruction over the public network to establish the connection over the communication path between the first local device and the second local device.

6. A user equipment configured to instruct establishing of a connection between a first local device and a second local device, the user equipment being configured to connect to a public network, wherein an intermediary system is configured to connect to a first local network, to a second local network and to the public network, wherein the first local device is connected to the first local network and the second local device is connected to the second local network, and wherein the first local device and the second local device are configured to connect over a communication path, the user equipment comprising:
    one or more processors; and
    memory storing instructions that when executed by the one or more processors cause the use equipment to carry out operations including:
        generating a virtual view comprising a first representation of the first local device in the first local network and a second representation of the second local device in the second local network;
        receiving a selection of the first representation in the virtual view;
        obtaining connectivity information regarding the communication path between the first local device and the second local device; and
        enabling or disabling, in dependence of the connectivity information regarding the communication path and in response to processing the selection of the first representation in the virtual view, an ability for a user of the user equipment to provide an instruction over the public network to establish the connection over the communication path between the first local device and the second local device, wherein the user equipment is configured to enable or disable the ability for the user comprises granting or denying access to the second representation in the virtual view.

7. The user equipment according to claim 6, wherein the connectivity information comprises a connection quality of the communication path and wherein the user equipment is further configured to control the ability of the user in dependence on the connection quality meeting a quality threshold associated with at least one of the first local device and the second local device.

8. The user equipment according to claim 6, wherein the operations further include:

receiving updated connectivity information from the intermediary system associated with the communication path; and enabling or disabling the ability for the user in dependence of the updated connectivity information.

9. The user equipment according to claim 6, wherein the user equipment is further configured to enable or disable the ability for the user in dependence of further access conditions associated with at least one of the user equipment, the first local device and the second local device.

10. The user equipment according to claim 6, wherein one or more further first local devices are connected to the first local network, and wherein the operations further include:

generating the virtual view comprising one or more further first representations of the one or more further first local devices;

obtaining further connectivity information comprising information that the one or more further first local devices are connected to the first local network and wherein the connectivity information comprises information that the second local device is connected to the second local network; and in response to receiving the selection of the first representation in the virtual view and in dependence of the connectivity information and the further connectivity information:

enabling the ability for the user to provide an instruction over the public network to establish a connection between the first local device and the one or more further first local devices; and disabling the ability for the user to provide an instruction over the public network to establish the connection over the communication path between the first local device and the second local device.

11. A method in an intermediary system for establishing a connection over a communication path between a first local device connected to a first local network and a second local device connected to a second local network, wherein the intermediary system is configured to connect to the first local network, to the second local network, and to a public network, the method comprising:

transmitting connectivity information regarding the communication path between the first local device and the second local device over the public network to user equipment;

receiving an instruction over the public network from the user equipment based on the connectivity information to establish the connection over the communication path;

establishing the connection over the communication path based on the received instruction;

obtaining updated connectivity information regarding the established connection over the communication path; and transmitting the updated connectivity information to the user equipment.

12. The method according to claim 11, wherein the intermediary system comprises a first intermediary device and a second intermediary device, the first intermediary device being configured to connect to the first local network and the second intermediary device being configured to connect to the second local network, and wherein establishing the connection over the communication path comprises connecting the first and second intermediary device based on the received instruction from the user equipment.

13. The method according to claim 11, wherein the connectivity information and/or the updated connectivity information comprises information relating to one or more firewalls associated with at least one of the first local network and the second local network.

14. An intermediary system configured for establishing a connection over a communication path between a first local device connected to a first local network and a second local device connected to a second local network, wherein the intermediary system is configured to connect to the first local network, to the second local network, and to a public network, and wherein the intermediary device comprises:

one or more processors; and memory storing instructions that when executed by the one or more processors cause the intermediary device to carry out operations including:

transmitting connectivity information regarding the communication path between the first local device and the second local device over the public network to user equipment;

receiving an instruction over the public network from the user equipment based on the connectivity information to establish the connection over the communication path;

establishing the connection over the communication path based on the received instruction;

obtaining updated connectivity information regarding the established connection over the communication path; and transmitting the updated connectivity information to the user equipment.

15. A non-transitory computer readable medium having stored thereon at least one software code portion for instructing establishment of a connection between a first local device and a second local device, the user equipment being connected to a public network, wherein an intermediary system is configured to connect to a first local network, to a second local network and to the public network and wherein the first local device is connected to the first local network and the second local device is connected to the second local network, wherein the first local device and the second local device are configured to connect over a communication path, wherein the at least one software code portion comprises instructions that, when executed by one or more processors of the user equipment, cause the user equipment to carry out operations including:

generating a virtual view comprising a first representation of the first local device in the first local network and a second representation of the second local device in the second local network;

processing a selection of the first representation in the virtual view;

obtaining connectivity information regarding the communication path between the first local device and the second local device; and enabling or disabling, in dependence of the connectivity information regarding the communication path and in response to processing the selection of the first representation in the virtual view, an ability for a user of the user equipment to provide an instruction over the public network to establish the connection over the communication path between the first local device and the second local device, wherein enabling or disabling the ability for the user comprises granting or denying access to the second representation in the virtual view.

* * * * *